United States Patent
Saito et al.

[11] Patent Number: 5,835,878
[45] Date of Patent: Nov. 10, 1998

[54] VEHICLE SPEED CONTROL SYSTEM

[75] Inventors: Yasushi Saito, Nagoya; Yoshihiro Nakamura, Kasugai, both of Japan

[73] Assignee: Aisin Seiki Kabushiki Kaisha, Kariya, Japan

[21] Appl. No.: 710,299

[22] Filed: Sep. 17, 1996

[30] Foreign Application Priority Data

Sep. 28, 1995 [JP] Japan .................................. 7-251008

[51] Int. Cl.$^6$ .............................. F02D 9/02; G06F 17/00
[52] U.S. Cl. .............................. 701/94; 701/93; 180/179; 123/361
[58] Field of Search ........................ 701/93, 94; 180/170, 180/178, 179; 123/349, 350, 361, 376

[56] References Cited

U.S. PATENT DOCUMENTS

| | | | |
|---|---|---|---|
| 4,359,125 | 11/1982 | Shinoda et al. | 180/179 |
| 4,803,637 | 2/1989 | Tada et al. | 364/426.04 |
| 4,856,609 | 8/1989 | Naito | 180/179 |
| 4,939,657 | 7/1990 | Imai et al. | 364/426.04 |
| 4,943,923 | 7/1990 | Naito | 364/426.04 |
| 5,749,063 | 5/1998 | Sakonjyu et al. | 701/93 |

FOREIGN PATENT DOCUMENTS 57-183537  11/1982  Japan .
58-28563   2/1983   Japan .

*Primary Examiner*—Michael Zanelli
*Attorney, Agent, or Firm*—Burns, Doane, Swecker & Mathis, LLP

[57] ABSTRACT

A feedback calculator and a controller are disclosed which energize a throttle valve driver so that a vehicle speed Vs may be brought into coincidence with a target vehicle speed Vo which is instructed by a driver. The feedback calculator calculates a target acceleration AT on the basis of a vehicle speed Vs and a target speed Vo, and also detects a running acceleration Aa of the vehicle and calculates a deviation of the running acceleration Aa with respect to the target acceleration AT, Ad=AT−Aa. It chooses a high gain G when the deviation Ad is positive and its change dAd is also positive, and chooses a low gain G when the deviation Ad is negative and its change dAd is also negative, thus deriving a controlled variable D having a magnitude which depends on the deviation Ad and the gain G. The controller energizes the throttle valve driver in accordance with the controlled variable D, thus driving the throttle valve for opening or closing at a rate which depends on the controlled variable D. In this manner, no substantial steady-state speed deviation is produced.

4 Claims, 7 Drawing Sheets

VEHICLE SPEED CONTROL SYSTEM

BACKGROUND OF THE INVENTION (a) Field of the Invention

The invention relates to a vehicle speed control system which utilizes a throttle driver for opening or closing a throttle valve of an onboard engine by means of an electric motor or a hydraulic actuator so that a running speed of a vehicle or vehicle speed Vs may be brought into coincidence with a target vehicle speed Vo which is set up or adjusted by a driver. A typical one of the hydraulic actuators is a negative pressure actuator which utilizes a negative pressure from the suction of the engine.

(b) Description of the Related Art

A vehicle speed control system of the kind described calculates an energizing signal or energizing data for the throttle driver in accordance with a deviation Vd=Vo−Vs between the target vehicle speed Vo and the running vehicle speed Vs, which is derived by a vehicle speed controller. Normally, a vehicle speed controller comprises a microcomputer, usually abbreviated by CPU or MPU.

Either when the throttle driver principally comprises an electric motor and a reduction gearing or when it comprises a negative pressure actuator, it is customary that the energizing signal be represented in terms of PWM pulse while energizing data is represented by the duty cycle or the width of high level H of the PWM pulse. For a throttle driver which comprises the electric motor, a current flows through the motor for an interval when the PWM pulse assumes its high level H, and ceases to flow during the interval when it is at its L level. Since PWM pulses are repeatedly produced with a short period, the current value through the motor, or a mean value as viewed in the time sequence, is proportional to the duty cycle of the PWM pulse. Thus for a high duty cycle, the motor rotates at a high speed to increase the rate with which the throttle valve is opened and closed. This rate is low for a small value of the duty cycle.

When the negative pressure actuator is employed in place of the motor, a solenoid operated changeover valve which selectively supplies a negative pressure from an engine intake manifold or an atmospheric pressure to a negative pressure chamber of the negative pressure actuator is energized with PWM pulse. For example, a negative pressure is applied to the negative pressure chamber during the interval of a high level H of the PWM pulse while the atmospheric pressure is applied during the interval of low level L of the PWM pulse. The absolute magnitude of the negative pressure in the negative pressure chamber is proportional to the duty cycle of the PWM pulse, and the withdraw stroke of an actuator rod is substantially proportional to the absolute magnitude of the negative pressure. A throttle valve is driven for opening by the withdraw stroke of the actuator rod through a link, and is driven for closing by the pushing stroke of the rod. In this instance, for an increased duty cycle of the PWM pulse, the actuator rod moves at an increased rate, and a throttle valve is driven for opening at an increased rate. The reverse is true for a small value of the duty cycle.

Utilizing such characteristic of the throttle valve driver, a target acceleration AT may be calculated on the basis of a vehicle speed deviation Vd=Vo−Vs while an acceleration Aa of a running vehicle can be calculated by differentiating the vehicle speed, thus deriving an acceleration deviation Ad=AT−Aa. An energizing signal for the throttle valve driver which nullifies the acceleration deviation Ad can be produced by a feedback calculation. The throttle valve driver may be energized on the basis of this energizing signal. A conventional vehicle speed control system of this kind is disclosed in Japanese Laid-Open Patent Applications No. 183,537/82 and No. 28,563/83.

When the vehicle is running on a flat road, an increase or decreases in the vehicle speed, or an acceleration or deceleration of the vehicle, occurs rapidly in response to the throttle valve which is driven for opening or closing by the throttle valve driver. Accordingly, the vehicle speed deviation Vd converges to zero substantially, and the distance traveled by the vehicle during an interval from the occurrence of the vehicle speed deviation Vd until its convergence to zero is relatively short, whereby a stable constant speed running is realized.

However, when the vehicle is running on an ascent of a relatively long travel or on a rapid ascent, a target acceleration AT which is produced on the basis of the vehicle deviation Vd is reduced for an ascent, and a corresponding acceleration of the vehicle is at a low level, whereby a phenomenon occurs that the vehicle speed deviation Vd remains relatively large and does not tend to be reduced, thus degrading the vehicle speed stability when running at a constant speed. The same applies when the vehicle carries a high payload even when it is running on a flat road. Also when a driver changes a target vehicle speed Vo relatively rapidly and through an increased increment or decrement, a lag in the increase of the vehicle speed Vs causes the vehicle speed Vs to overshoot immediately after the change is made, and a subsequent convergence to the target vehicle speed Vo is retarded.

SUMMARY OF THE INVENTION

It is a first object of the invention to enhance the speed stability when running at a constant speed, and it is a second object of the invention to suppress a variation in a vehicle speed which is caused by either a slope of the road or a variation in the payload or which may be caused by an overshoot of the vehicle speed Vs as a target vehicle speed Vo is changed.

In accordance with the invention, a feedback calculator calculates a target acceleration AT on the basis of a running speed Vs and a target speed Vo of a vehicle, and also detects a running acceleration Aa of a vehicle, thereby calculating a deviation At=AT−Aa between the target acceleration AT and the running acceleration Aa. It chooses a high gain when the deviation Ad is positive and its change dAd is also positive, and a small gain G when the deviation Ad is negative and its change dAd is also negative, thus deriving a controlled variable D having a magnitude which depends on the deviation Ad and the gain G. A controller energizes a throttle valve driver in accordance with the controlled variable D, thus driving a throttle valve for opening or closing at a rate which corresponds to the controlled variable D.

When the vehicle is running on an ascent, a deviation of the running acceleration Aa with respect to the target acceleration AT, Ad=AT−Aa, is positive and increases, and its change dAd is positive, meaning that the vehicle tends to be decelerated. At this time, the feedback calculator chooses a high gain G, whereby the controlled variable D which depends on the acceleration deviation Ad will be increased as compared when the vehicle is running on a flat road, and the controller then causes the throttle valve driver to drive the throttle valve for opening at an increased rate. Accordingly, the opening of the throttle valve is increased rapidly, whereby the vehicle speed Vs rapidly converges to the target vehicle speed Vo, without substantially producing a steady-state speed deviation.

When the target vehicle speed Vo is increased relatively rapidly, an increase in the vehicle speed Vs will be lagging. When the vehicle speed Vs overshoots the target vehicle speed Vo immediately after terminating the increasing target vehicle speed Vo, the deviation of the running acceleration Aa with respect to the target acceleration AT, Ad=AT−Aa, will be negative, and its change dAd will also be negative. At this time, the feedback calculator chooses a small gain G, whereby the controlled variable D which depends on the acceleration deviation Ad will be reduced. Thus, the controller causes the throttle valve driver to drive the throttle valve for opening at a reduced rate.

Accordingly, an overshoot of the vehicle speed Vs will be terminated soon without substantially producing any hunting or an oscillation of the vehicle speed Vs about the target value Vo. No steady-state speed deviation is substantially produced.

In a first embodiment of the invention, to be described later, the feedback calculator chooses a high gain Gmax when the deviation Ad is positive and its changed dAd is also positive and chooses a small gain Gmin when the deviation Ad is negative and its change dAd is also negative whenever the deviation Ad lies in a given range, and chooses a high gain Gmax when the deviation Ad is out of the range. With this arrangement, when the deviation Ad goes out of the range, or when the absolute magnitude of the deviation Ad is too large, a high gain G is automatically chosen. This increases the controlled variable D which depends on the acceleration deviation Ad, and the controller then causes the throttle valve driver to drive the throttle valve for opening or closing at an increases rate. This means that the vehicle speed Vs rapidly converges to the target vehicle speed Vo. It will be seen that a speed recovery rate is high for a temporary increase in the absolute magnitude of the deviation Ad.

Other objects and features of the invention will become apparent from the following description of several embodiments thereof with reference to the drawings.

DESCRIPTION OF THE PREFERRED EMBODIMENTS

First Embodiment

Figure 1:
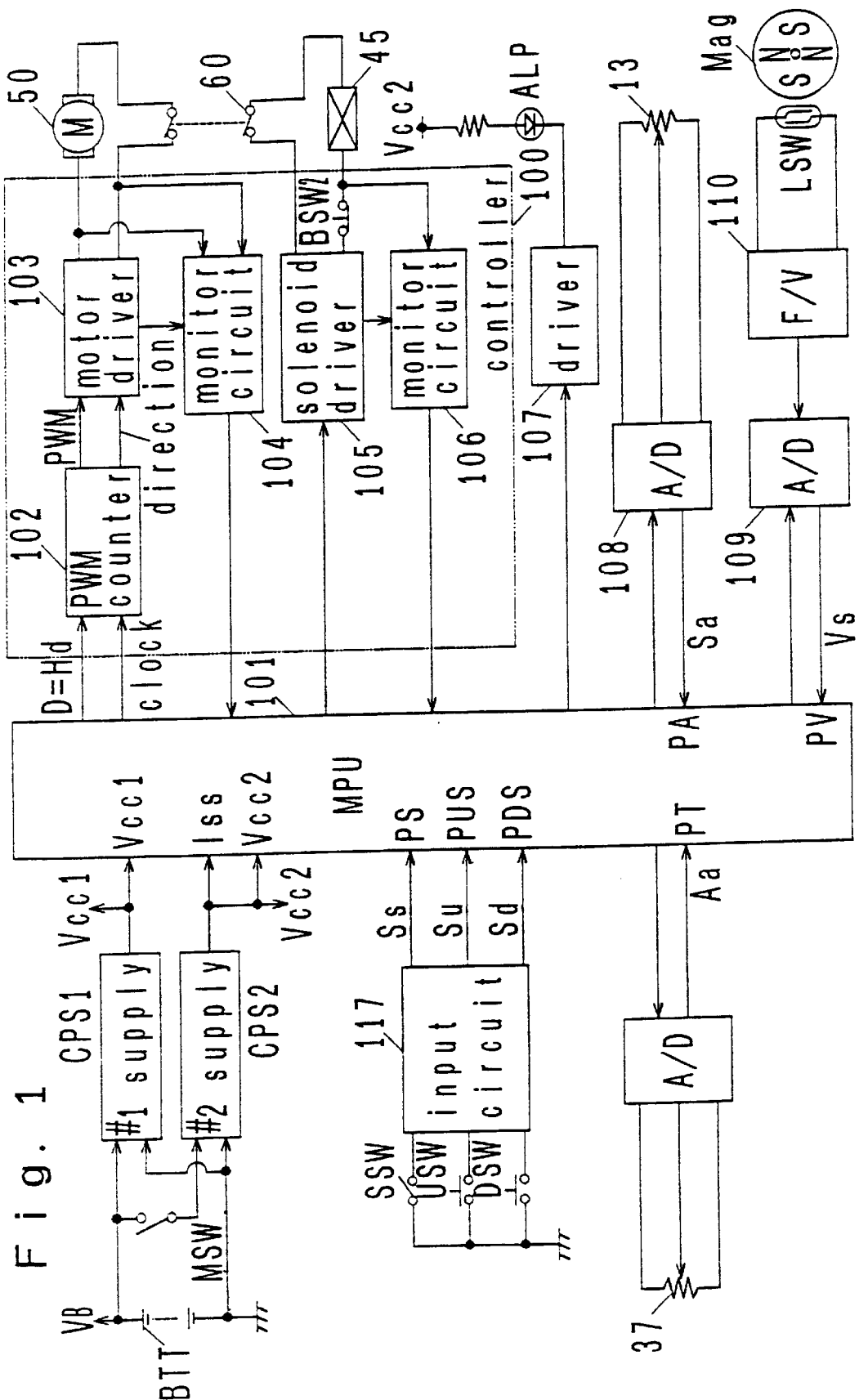
FIG. 1 is a block diagram of a first embodiment of the invention, illustrating the general arrangement.
Figure 2:
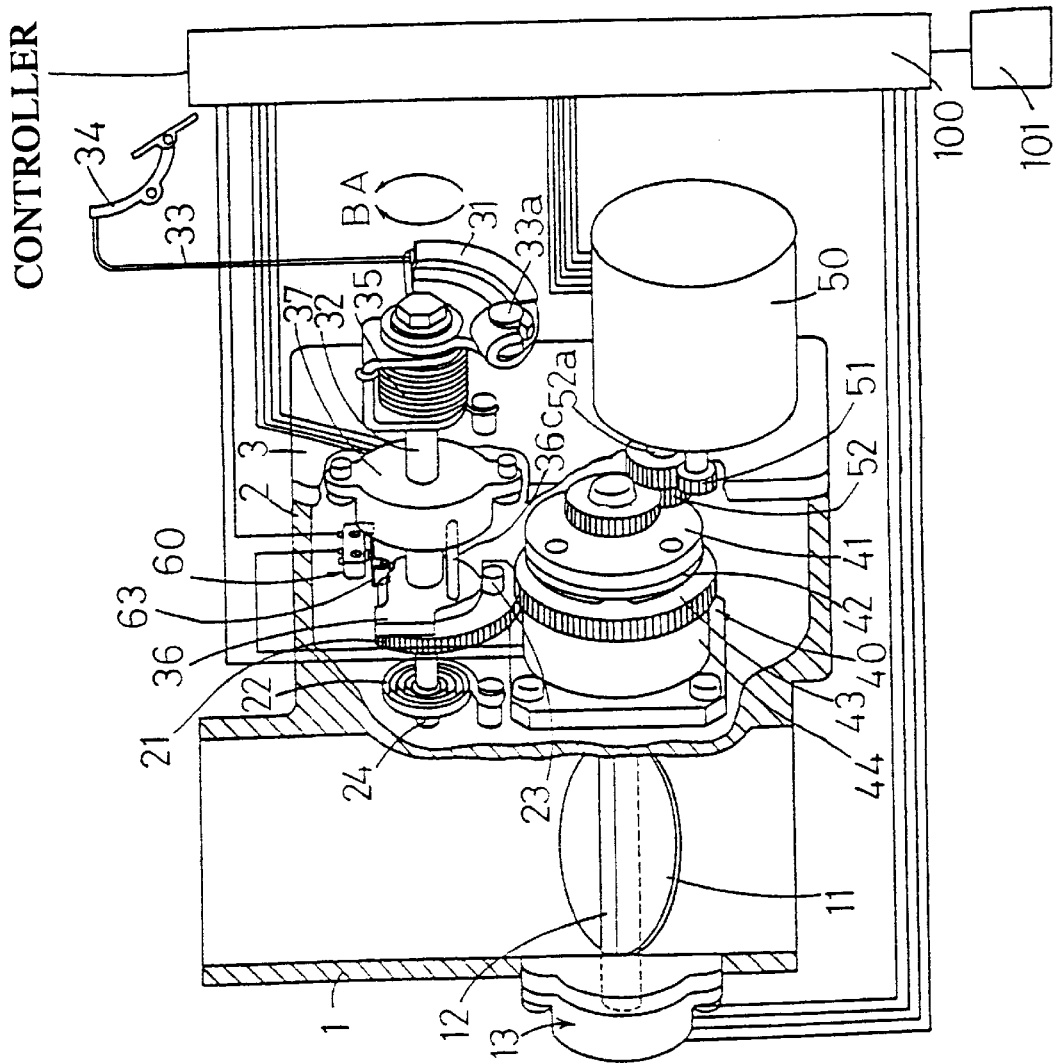
FIG. 2 is a perspective view of a throttle valve driver including motor 50 shown in FIG. 1, illustrating the appearance thereof.
Figure 3:
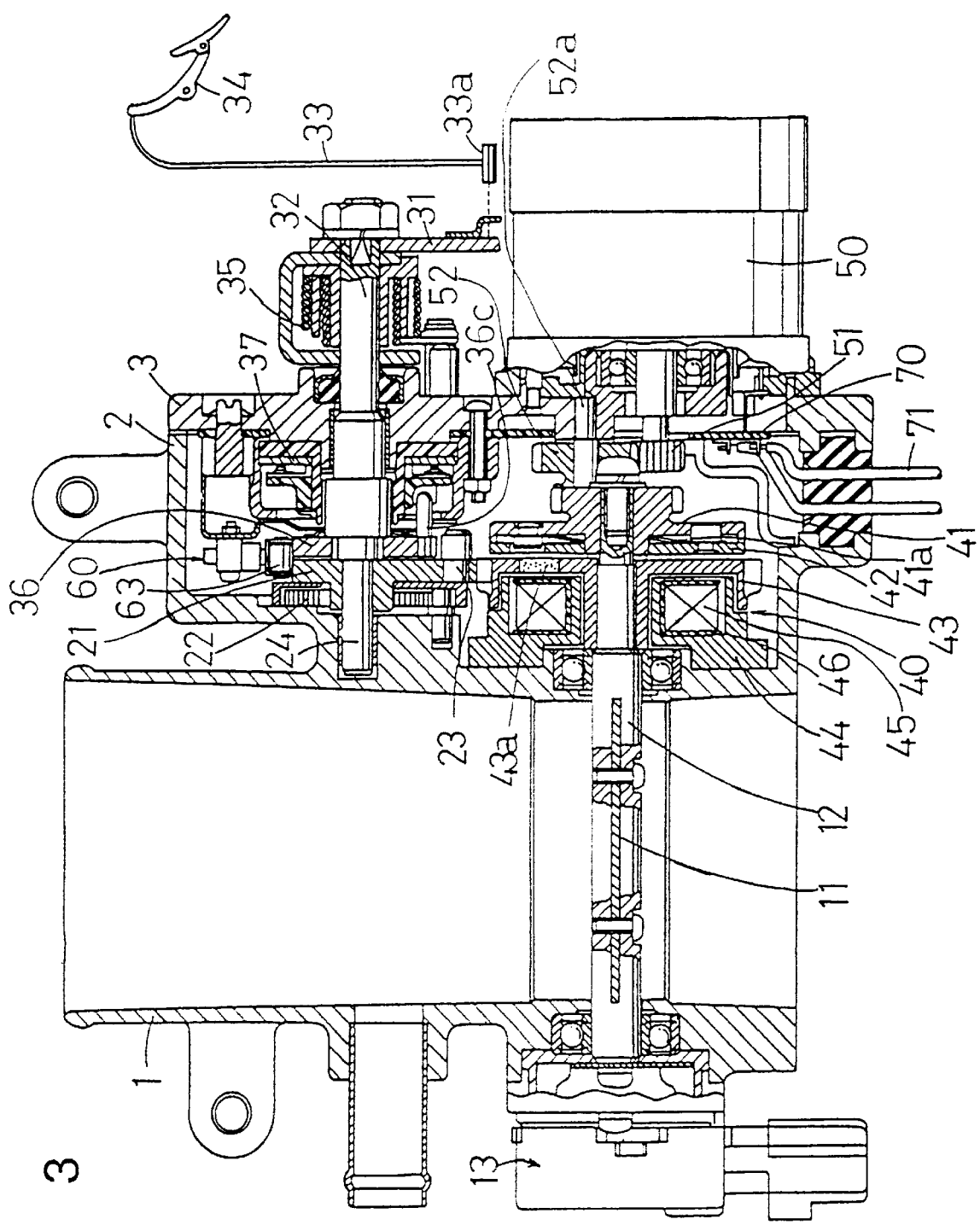
FIG. 3 is a cross section illustrating the essential part of the throttle valve driver shown in FIG. 2.

Referring to FIG. 1 which shows the general arrangement of a first embodiment of the invention, FIG. 2 which shows the appearance of a throttle valve drive mechanism of an onboard engine and FIG. 3 which shows the cross section of the throttle valve drive mechanism, a throttle valve 11 is rotatably supported by a throttle shaft 12 in a suction passage which is an air flow path of a throttle body 1 of an onboard engine. A casing 2 is integrally formed with a side of the throttle body 1 on which one end of the throttle shaft 12 is supported, and a throttle valve driver is assembled in the casing 2 and its associated cover 3. A throttle opening monitoring potentiometer 13 is mounted on the side of the throttle body 1, which is opposite from the casing 2 or in which the other end of the throttle shaft 12 is supported. The potentiometer 13 is a throttle opening sensor which generates an analog electrical signal representing the opening of the throttle valve 11, and includes a slider which is connected to the throttle shaft 12.

A movable yoke 43 is fixedly mounted on the other end of the throttle shaft 12, thus the throttle valve 11 integrally rotating with the movable yoke 43. The movable yoke 43 comprises a circular and dish-shaped magnetizable member including a shaft which is secured to the throttle shaft 12, and is fitted in a fixed yoke 44 having a similar configuration and which is also formed of a magnetizable material with a given clearance therebetween, with respective open ends located opposite to each other and respective sidewalls and axes axially aligned with each other. The fixed yoke 44 is fixedly mounted on the throttle body 1, and defines a space between its axis and sidewall in which a clutch solenoid 45 disposed on a bobbin 46 of a non-magnetizable material is received.

A friction member 43a of a non-magnetizable material is embedded in the bottom surface of the movable yoke 43 and in surrounding relationship with the throttle shaft 12. A drive plate 41 is disposed in opposing relationship with the friction member 43a with a clutch plate 42 in the form of a disc and formed of a magnetizable material interposed therebetween.

The drive plate 41 comprises a circular and dish-shaped member carrying a shaft at its center which is supported in a rotatable manner with respect to the throttle shaft 12. The shaft of the drive plate 41 is integrally formed with an external gear which meshes with external teeth formed around a portion of a gear 52, which will be described later, having a reduced diameter. The clutch plate 42 is coupled to the bottom surface of the drive plate 41 through a leaf spring 41a, which causes the clutch plate 42 to be attracted toward the drive plate 41, whereby the clutch plate is spaced from the movable yoke 43 when the clutch solenoid 45 is deenergized.

The gear 52 which is in meshing engagement with the drive plate 41 is in the form of a stepped circular column having portions of a reduced diameter and an increased diameter, each of which is formed with external teeth, and is rotatably supported around a shaft 52a which is secured to the cover 3. A motor 50 is fixedly mounted on the cover 3 and includes a rotary shaft which extends parallel to the shaft 52a and is rotatably supported. A gear 51 is fixedly mounted on the distal end of the rotary shaft of the motor 50, and meshes with the external teeth formed around the portion of the gear 52 which has an increased diameter. The motor 50 comprises a stepper motor.

When the motor 50 is set in motion and the gear 51 rotates, the gear 52 also rotates, whereby its meshing drive plate 41 rotates around the throttle shaft 12 together with the clutch plate 42. If the clutch solenoid 45 is not energized at this point in time, the clutch plate 42 is spaced from the movable yoke 43 as urged by the leaf spring 41a. In this instance, the movable yoke 43, the throttle shaft 12 and the throttle valve 11 are freely rotatable independently from the drive plate 41. When the clutch solenoid 45 is energized and the movable yoke 43 and the fixed yoke 44 are excited, the electromagnetic force causes the clutch plate 42 to be attracted toward the movable yoke 43 and into abutment against the movable yoke 43 against the resilience of the leaf spring 41a.

This establishes a frictional engagement between the clutch plate 42 and the movable yoke 43, allowing the both members to rotate together while maintaining their abutment as assisted by the frictional member 43a. In this instance, the drive plate 41, the clutch plate 42, the movable yoke 43, the throttle shaft 12 and the throttle valve 11 are integrally coupled together, and are driven for rotation by the motor 50 through the gears 51, 52.

Rotatably supported by the cover 3 is an accelerator shaft 32 extending parallel to the throttle shaft 12 and projecting externally of the cover 3. An accelerator link 31, which forms a rotary lever, is fixedly mounted on the projecting end of the accelerator shaft 32, and a pin 33a fixedly connected to one end of an accelerator cable 33 is locked to the free end of the accelerator link 31. A return spring 35 is connected to the accelerator link 31 for urging the accelerator link 31 and the accelerator shaft 32 in a direction to close the throttle valve 11.

The other end of the accelerator cable 33 is connected to an accelerator pedal 34, which may be operated to cause the accelerator link 31 and the accelerator shaft 32 to move angularly about the axis of the accelerator shaft 32.

A plate-shaped accelerator plate 36 is fixedly connected to the left end of the accelerator shaft 32, and a circular opening is formed in the left end to receive the right end of an additional intermediate shaft 24 for supporting it in a rotatable manner. The left end of the intermediate shaft 24 is rotatably supported by the throttle body 1. A throttle plate 21 in the form of a plate is rotatably mounted on the intermediate shaft 24 and is located opposite to the accelerator plate 36.

The throttle plate 21 includes portions of a reduced diameter and an increased diameter which are secured to the intermediate shaft 24, and the portion of an increased diameter is formed with external teeth around its periphery. The external teeth of the throttle plate 21 mesh with the external teeth formed around the movable yoke 43, whereby when the throttle plate 21 is driven for rotation, the movable yoke 43 rotates to cause the throttle shaft 12 and the throttle valve 11 coupled thereto to rotate.

The throttle plate 21 includes a sleeve through which the intermediate shaft 24 extends, and an end cam which continues from the sleeve. The end cam includes a portion of an increased diameter, one lateral side of which is disposed opposite to a stop, not shown, which is mounted on the casing 2, thereby limiting the rotation of the throttle plate 21. A pin 23 is fixedly mounted on the portion of the throttle plate 21 which has an increased diameter.

A return spring 22 has its one end anchored to the sleeve or the axle portion of the throttle plate 21 and its other end anchored to a pin which is fixedly mounted on casing 2. Accordingly, the throttle plate 21 is urged by the return spring 22 in a direction which causes the lateral side of the portion of an increased diameter thereof to abut against the casing 2. In this manner, the throttle plate 21 is urged by the return spring 22 in a direction to close the throttle valve 11.

The accelerator plate 36 comprises a disc portion centrally located and fixedly mounted on the accelerator shaft 32 and a diametrically extending arm. The disc portion has a reduced diameter in a region where it continues to the arm and has a recess formed therein. The outer peripheral surface of the disc portion defines a cam. One side of the arm is disposed in opposing relationship with a stop, not shown, mounted on the casing 2 while the other side is disposed in opposing relationship with the pin 23 on the throttle plate 21. When the accelerator plate 36 rotates in the counter-clockwise direction A as viewed in FIG. 2, and the arm abuts against the pin 23 on the throttle plate 21, the accelerator plate 36 and the throttle plate 21 rotate in an integral manner. Normally when the throttle plate 21 is not urged for rotation by the motor 50 and an accelerator pedal is not depressed, the arm of the plate 36 abuts against the pin 23. FIGS. 2 and 3 illustrate this condition.

The accelerator plate 36 is urged to rotate in the clockwise direction B (FIG. 2) under the resilience of a return spring 35. A pin 36c extending in the axial direction of the accelerator shaft 32 is fixedly mounted on the accelerator plate 36.

A potentiometer 37 is fixedly mounted around the outer periphery of a bearing formed in the cover 3 for receiving the accelerator shaft 32. The potentiometer 37 is an accelerator opening sensor having a slider which is engaged by the pin 36c. In this manner, the potentiometer 37 produces an analog electrical signal representing an angle of rotation of the accelerator shaft 32. The potentiometer 37 is electrically connected to a printed circuit board 70 which is inserted between the casing 2 and the cover 3, and the printed circuit board 70 has leads 71 connected thereto.

A limit switch 60 which is mechanically coupled to the throttle plate 21 and the accelerate plate 36 is secured to the casing 3 through a stay and is electrically connected to the printed circuit board 70. The limit switch 60 is a normally closed switch which is changed from its closed to its opened position by the cam on the throttle plate 21 when the opening of the throttle valve 11 reaches its upper limit. The limit switch 60 is connected in feed lines for the clutch solenoid 45 associated with the clutch 40 and the motor 50, respectively, and when the limit switch 60 is opened, both the clutch solenoid 45 and the motor 50 are deenergized.

In the throttle valve driver described above, the yoke 43 is fixedly mounted on the throttle shaft 12 and has external teeth which mesh with external teeth on the throttle plate 21. The throttle plate 21 is rotatably mounted on the intermediate shaft 24 which is freely rotatable with respect to the accelerate shaft 32, and is normally urged by the return spring 22 to rotate in the clockwise direction B (FIG. 2) in a forcible manner. As a result of a combination mentioned above, the throttle valve 11/throttle shaft 12/yoke 43/throttle plate 21 are coupled together for rotation, and when the accelerator pedal 34 is not depressed and the clutch solenoid 45 associated with the clutch 40 is deenergized, the throttle valve 11 assumes a minimum opening or an idling opening under the influence of the return spring 22.

When conducting an automatic speed control, the clutch solenoid 45 is energized, whereby the drive plate 41 is frictionally coupled to the yoke 43. When the motor 50 is energized for rotation in the forward direction to rotate the drive plate 41 in the counter-clockwise direction A (FIG. 2), the opening of the throttle valve 11 increases. When the motor 50 is energized for rotation in the reverse direction to rotate the drive plate 41 in the clockwise direction B (FIG. 2), the opening of the throttle valve 11 decreases. The potentiometer 13 which is coupled to the throttle shaft 12 produces an analog signal which represents the opening of the throttle valve.

Immediately before the opening of the throttle valve 11 reaches a mechanical maximum value (whereupon the throttle plate 21 abuts against a mechanical stop), the throttle plate 21 changes the limit switch 60 from its closed to its opened condition, whereby the feed lines for the clutch solenoid 45 and the motor 50 are interrupted, whereby the motor 50 ceases to be energized for rotation in the forward direction and the solenoid operated clutch 40 ceases to be energized. When the clutch 40 is deenergized, the throttle valve 11 is returned in its closing direction under the influence of the return spring 22. However, as the valve 11 returns, when the limit switch 60 is returned to its closed condition, the clutch solenoid 45 associated with the clutch 40 is again energized to activate the clutch 46, whereupon the throttle valve 11 ceases to rotate in its closing direction which occurs under the influence of the return spring 22. It will be seen that as a result of such action, whenever it is attempted to drive the throttle valve 11 to or beyond the mechanical maximum opening, the opening of the throttle valve 11 is held at a value which is just short of the mechanical maximum opening.

When a certain opening of the throttle valve 11 is established by the motor 50 while the clutch 40 is energized, a depression of the accelerator pedal 34 cannot operate the throttle valve 11 as long as the accelerator plate 36 does not engage the pin 22 on the throttle plate 21, or in a range of the rotation of the accelerator plate 36 which is less than the rotation of the throttle plate 21.

When the accelerator pedal 34 is depressed and the rotation of the accelerator plate 36 increases until it abuts against the pin 22, the throttle plate 21 becomes coupled to the accelerator plate 36, whereupon the opening of the throttle valve 11 corresponds to the degree of depression of the accelerator pedal. As the degree of depression of the accelerator pedal increases, the opening of the throttle valve 11 increases. Any slight return of the depression of the accelerator pedal causes the opening of the throttle valve 11 to be reduced under the influence of the return spring 22. In this manner, the opening of the throttle valve is determined in accordance with a degree of depression of the accelerator pedal when a constant speed mode (automatic speed control) is not applied or even during the constant speed mode if the degree of depression of the accelerator pedal exceeds the rotation of the throttle plate 21.

A motor driven throttle valve open/close drive mechanism as mentioned above is controlled by an electrical control circuit shown in FIG. 1. Control circuit comprises a microcomputer (hereafter abbreviated as MPU) 101 as well as a variety of drivers, converters, an input circuit and switches. These components are fed with a voltage VB from a battery BTT, a constant voltage Vcc1 from a first voltage supply CPS1 and/or a constant voltage Vcc2 from a second constant voltage supply CPS2. Feed lines are not specifically shown in FIG. 1, since the supply of the voltages VB and Vcc1 is contingent only the connection of the battery BTT and as long as the battery BTT is connected, such voltages are normally supplied. The supply of the voltage Vcc2 also requires the turn-on of a main switch MSW, and this voltage Vcc2 is fed to MPU 101 and an alarm 1 amp ALP or the like.

Within MPU 101, a constant voltage Vcc2 from the second supply CPS2 is used to setup a standby mode and a return to a normal mode. In the standby mode, a high impedance condition is established on all input/output ports, whereby registers assume a status and REM maintains a content which prevailed immediately before the application of the constant voltage Vcc2. Thus, this mode represents a power saving mode in which a software operation is interrupted. When the constant voltage Vcc2 ceases to be applied, MPU 101 sets up the standby mode. However, once this mode is set up, a software operation works no longer, and accordingly, a return to the normal mode requires a hardware control. A port which is used at this end is a control port Iss. When the constant voltage Vcc2 from the second supply CPS2 is applied to the control port Iss, MPU 101 returns from the standby mode to the normal mode. The operation of various parts will be described bellow.

PWM counter 102 is fed with PWM data D and clock pulse from MPU 101. PWM data D represents the duration Hd of a high level H of the PWM pulse. PWM data D is given as a positive or a negative value, the sign representing the direction in which the motor 50 is to be energized and the magnitude or the absolute value representing the duration Hd of the high level, which corresponds to a duty cycle. Thus, when PWM data D=Hd other than zero is applied to PWM counter 102, it turns a PWM pulse to its high level H, which commands the energization, and establishes a direction of energization control signal at its H level if the sign is positive and establishes the direction of energization control signal at its low level L if the sign is negative. Subsequently, the counter begins counting the clock pulses. When a count in the counter is equal to the absolute value of PWM data D=Hd, the counter turns the PWM pulse to its low level L, which commands the deenergization. When a time interval passes subsequently which is equal to the period of PWM (50 msec)—absolute value of D, it again turns the PWM pulse to its high level H, delivering one pulse. In this manner, the counter repeats the described operation subsequently.

The PWM pulse and the direction of energization control signal delivered from the PWM counter 102 are fed to a motor driver 103, to which the motor 50 of the motor driven throttle valve driver (FIG. 3) is connected. In response to a direction control signal which assumes a H level, the motor driver 103 energizes the motor 50 for rotation in the forward direction as long as the PWM pulse assumes its H level. If the direction control signal is at its L level, the driver energizes the motor 50 for rotation in the reverse direction as long as the PWM pulse is at its H level. The energization is interrupted during an interval when the PWM pulse is at its L level. The operation of the motor driver 103 is monitored by a monitor circuit 104.

The limit switch 60 mentioned above is connected in series with the feed line of the motor 50. The switch limits the rotation of the throttle valve 12 which exceeds the limit of forward rotation. Specifically, the rotation of the motor 50 in the forward direction is transmitted to the throttle shaft 12 through the clutch, and the throttle shaft 12 rotates in a direction to wind up the wire 42. When such rotation exceeds an angle which corresponds to the upper limit of the throttle opening, the limit switch 60 is opened to interrupt the energization of the motor 50 for rotation in the forward direction and deactivates the clutch, whereupon the throttle shaft 12 rotates reversely under the influence of the return spring 22. When the limit switch 60 is closed again, the clutch is activated again to energize the motor 50 for rotation in the forward direction. When the rotation of the throttle shaft 12 falls below an angle which corresponds to the lower limit of the throttle opening, the energization for rotation in the reverse direction is blocked by a mechanical stop, not shown.

A solenoid driver 105 is connected to the clutch solenoid 45 of the throttle valve driver mentioned above. In response to a command from MPU 101 to energize the clutch, the clutch solenoid 45 is energized. The solenoid 45 is deenergized in response to a command to deenergizes the clutch.

A normally closed brake switch BSW2 which is mechanically coupled to a depression of the brake pedal (not shown) and the limit switch 60 are connected in the feed line of the clutch solenoid 45. The brake switch BSW2 opens its contacts in response to the depression of a brake pedal, thus interrupting the feed line for the clutch solenoid 45. The limit switch 60 controls the limit of rotation of the output throttle shaft 12. Accordingly, when the brake pedal is depressed or when the rotation of the throttle valve 11 reaches its upper limit, the clutch solenoid 45 is immediately deenergized. The operation of the solenoid driver 105 and the operation of the brake switch BSW2 are monitored by a monitor circuit 106.

A lamp driver 107 energizes the alarm lamp ALP in response to a command from MPU 101. The alarm lamp ALP is mounted on a instrument panel, not shown, of a vehicle which is equipped with a system shown in FIG. 1, and provides a back lighting for a message plate indicating "Inspection of Autodrive necessary".

An A/D converter 108 operates to perform a digital conversion of a voltage detected by the potentiometer 13 and feeds it back to MPU 101 in response to a chip select supplied from MPU 101. An A/D converter 109 performs a digital conversion of an output voltage from a F/V converter 110 and feeds it back to MPU 101 in response to a chip select supplied from MPU 101. An A/D converter 111 performs a digital conversion of a voltage detected by the potentiometer 37 and feeds it back to MPU 101 in response to a chip select supplied from MPU 101.

F/V converter 110 is a frequency-to-voltage converter where the frequency of a signal produced by turn-on/off of a reed switch LSW which occurs in response to the magnetism of a rotary permanent magnet Mag coupled to the output shaft of a transmission, not shown, is converted into a corresponding voltage. In this manner, the F/V converter 110 delivers a voltage signal having a level which is proportional to the vehicle speed Vs.

An input circuit 117 is an input interface for allowing MPU 101 to read the on/off conditions of switches SSW, USW and DSW. The switches USW and DSW are mounted on a inner panel, located forwardly of a driver's seat, not shown, of the vehicle for allowing the driver to command an acceleration (switch USW on) or deceleration (switch DSW on) during the automatic speed control.

Figure 4:
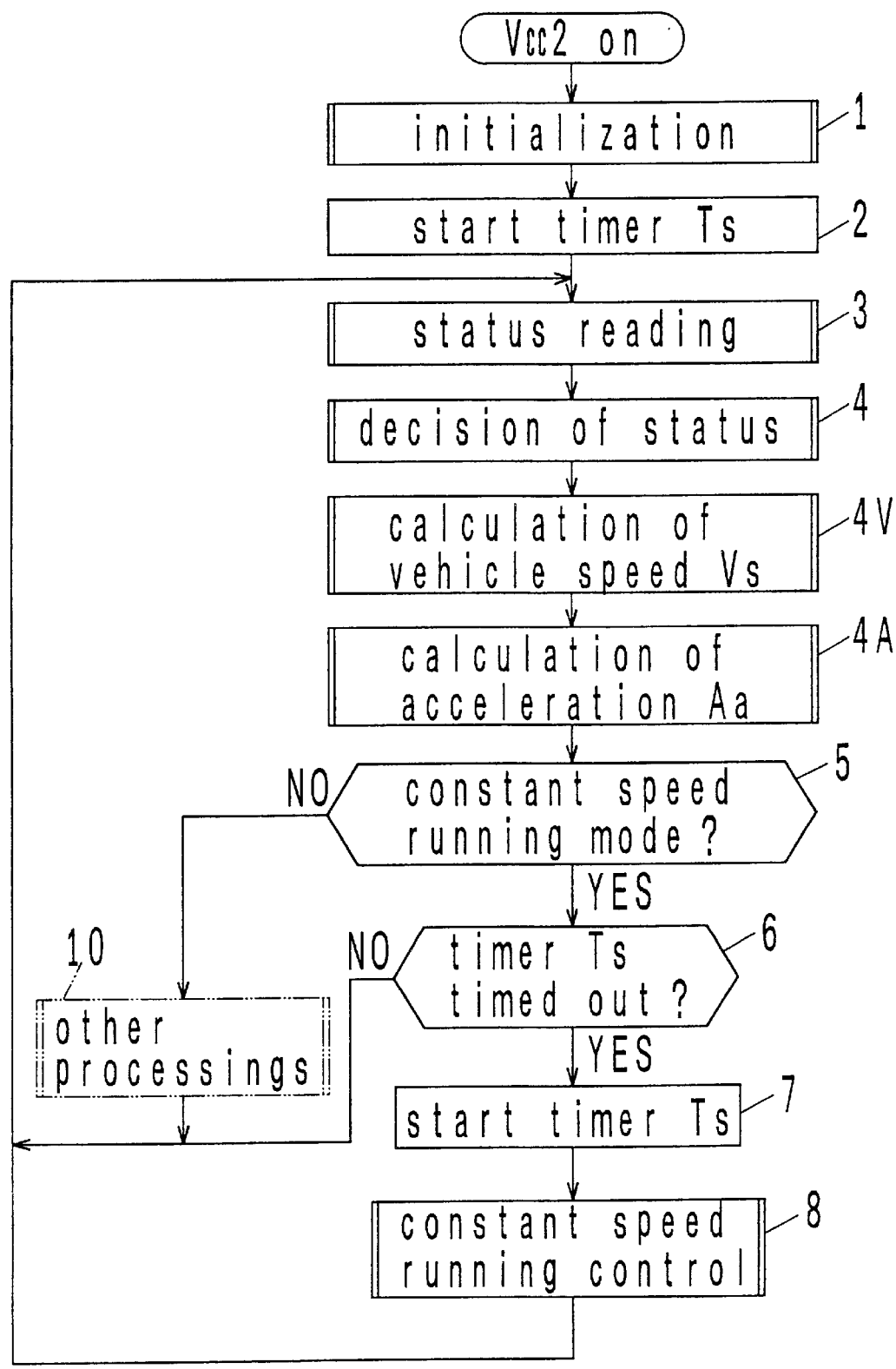
FIG. 4 is a flow chart illustrating a constant speed running control operation by MPU 101 shown in FIG. 1 in summary.

FIG. 4 is a flow chart illustrating a control operation for a constant speed running control which is performed by MPU 101 shown in FIG. 1. It is to be understood that MPU 101 executes controls other than the constant speed running control in which the throttle valve opening is changed or adjusted, but the detail of such controls is omitted from illustration. In the description to follow, only the control operation relating to the constant speed running control will be given.

When Vcc2 is on or when the main switch MSW is closed and the constant voltage Vcc2 is applied to MPU 101, the latter executes an initialization, thus setting up signal levels to various input/output ports, clearing data in various registers which are allocated to an internal memory within MPU 101, and initializing parameters (step 1).

After the initialization, MPU 101 starts a timer Ts having a time limit of Ts=10 msec at step 2, and performs a "status reading" at step 3. During the status reading at step 3, digital data RVs (a previous value of vehicle speed detected) is written into register RBVs.

Signal level Ss (assuming L level when automatic speed control command switch SSW is on and assuming H level when the switch is off) at input port PS is read and written into register RSs. Signal level Su (assuming L level when the acceleration switch USW is on and assuming H level when the switch is off) at input port PUS is read and written into register RSu. Signal level Sd (assuming L level when deceleration switch DSW is on and assuming H level when the switch is off) at input port PDS is read and written into register RSd. Digital data Sa (representing the opening of the throttle valve 11 or a digital conversion of an analog signal from the potentiometer 13 acting as a throttle opening sensor) produced by the A/D converter 108 in response to an A/D conversion command issued to the A/D converter 108 is read and written into register Sa. Digital data Ap (representing the degree of depression of the accelerator pedal 34 or a digital conversion of an analog signal from the potentiometer 37 acting as an accelerator angle sensor) produced by the A/D converter 111 in response to an A/D conversion command issued to the A/D converter 111 is read and written into register Ap. Digital data Vs (a digital conversion of an analog voltage having a level which is substantially proportional to a vehicle speed) produced by A/D converter 109 in response to an A/D conversion command issued to the A/D converter 109 is written into register RVs (all these operations taking place at step 3).

It is to be noted that in the description to follow, both a particular register and data stored therein may be represented by same reference characters. By way of example, data stored in register RVs may be represented as RVs.

MPU 101 then makes a decision of various status (step 4). In the "decision of status" (step 4), an examination is made to see if the automatic speed control command switch SSW is closed (RSs=L) or if the accelerator angle is equal to an idling angle (Ap or idling opening). If the answer is YES in both instances, "1" representing the need for a constant speed running control is written into a flag register Fc. If the answer NO in either instance, "0" indicating that the automatic speed control is unnecessary is written into the flag register Fc. An A/D conversion command is issued to the A/D converter 109 in order to write digital data Vs (a digital conversion of an analog voltage having a level substantially proportional to the vehicle speed) produced by the A/D converter 109 into register RVs (step 4V).

A vehicle speed Vsp24 which was written 24 cycle before is subtracted from the vehicle speed Vs which is written during the current cycle to derive a difference value Aa=Vs−Vsp24, which is written into an acceleration register RAs. The oldest value or the value written into 24 cycle before is discarded from a table storing values of vehicle speed Vs over past 24 read cycles (which is defined by an area of an internal memory within the MPU 101), and the latest read value is written into the table, thus updating the table to the latest 24 values. In this manner, a data shift and a data updating occurs (step 4A).

Since the calculation of the vehicle speed Vs (step 4V) and the calculation of the acceleration Aa (step 4A) are repeated at an interval of Ts=10 msec, it will be seen that the acceleration Aa derived at the step 4A represents a variation in the vehicle speed over a time interval of dt=250 msec.

MPU 101 then determines whether the constant speed running control is necessary (Fc=1) or unnecessary (Fc=0) (step 5).

When it is found that the constant speed running control is necessary (Fc=1), the microcomputer waits for the timer Ts to time out (step 6), whereupon the timer Ts is restarted (step 7), and "constant speed running control" (step 8) is executed. Upon execution of the constant speed running control, the operation returns to "status reading" (step 3). As long as the constant speed running control is necessary (Fc=1 ), the operation from step 3 to step 9 are repeatedly executed at an interval of Ts.

Figure 5:
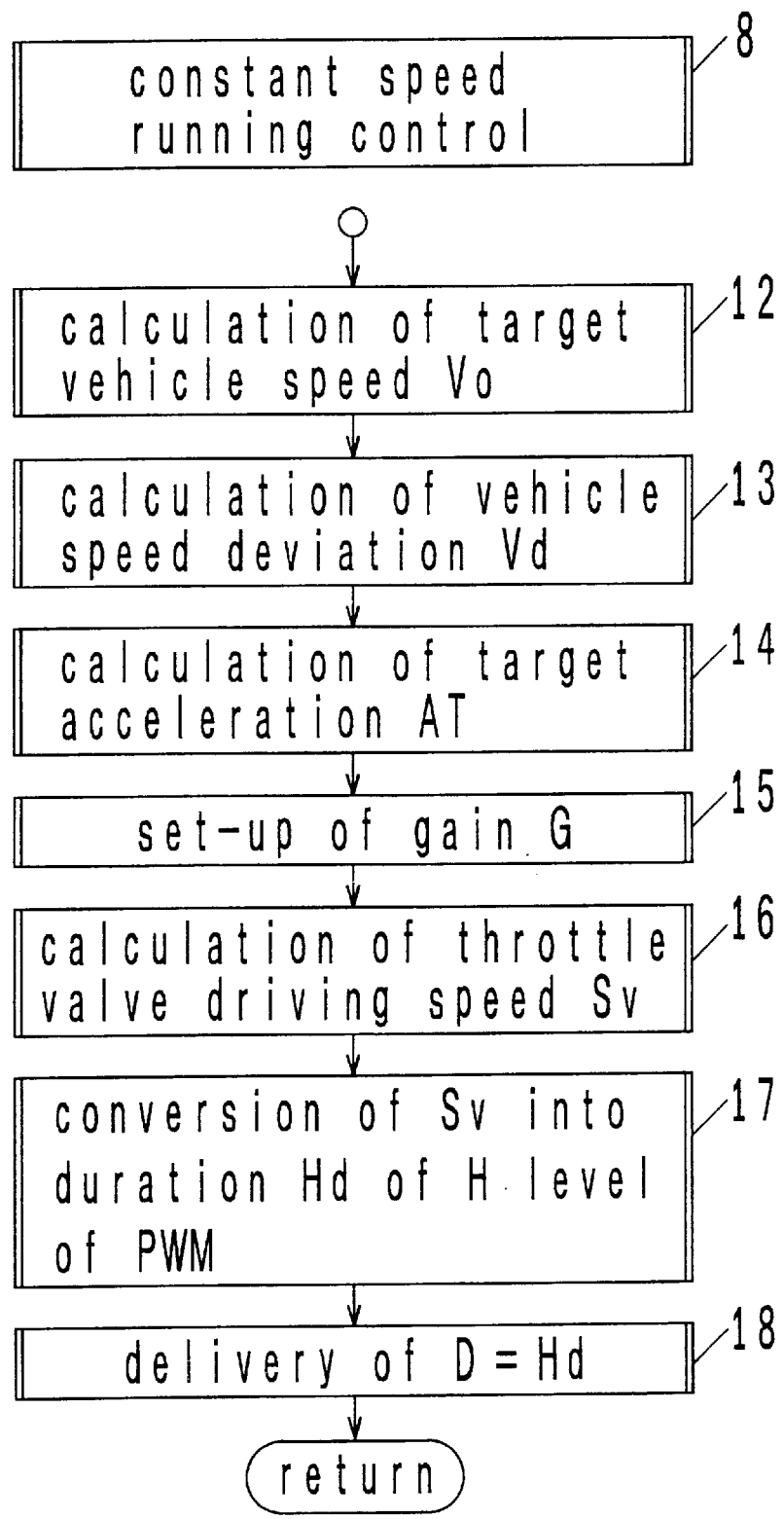
FIG. 5 is a flow chart showing "constant speed running control" (8) shown in FIG. 4 in detail.

FIG. 5 shows the detail of the "constant speed running control" (step 8), in particular, an operation required to drive the throttle valve, while other operations are omitted from illustration. The "constant speed running control" (step 8) is executed at an interval of Ts=10 msec. Initially, a target vehicle speed Vo is calculated (step 12). It is to be noted that the target vehicle speed Vo which is determined at this step utilizes a vehicle speed Vs as a reference value which applies when the vehicle is running on a flat road and when both the brake pedal and accelerator pedal are released, and is adjusted therefrom in accordance with the closure of vehicle speed up switch USW and/or vehicle speed down switch DSW. When a vehicle running condition which is determined by MPU 101 on the basis of Aa, Sa and Vs as well as their change in the time sequence represents a running along a curved road or a running through the street, a corresponding correction is added to establish the target vehicle speed Vo.

MPU 101 then calculates a vehicle speed deviation Vd=Vo−Vs (step 13). Then follows a calculation of a target acceleration AT=(1/kc)Vd (step 14). In this embodiment, kc=8 is chosen assuming that Vd is represented in unit of km/h and AT is represented in unit of km/(h·sec). MPU 101 then determines a gain G (step 15), the detail of which will be described later in detail with reference to FIG. 6.

MPU 101 then calculates a throttle valve driving speed Sv=G·Ad (step 16). Ad represents an acceleration deviation Ad=AT−Aa which is calculated during the "set-up of gain G" (step 15) which will be described later.

Subsequently, MPU 101 converts the throttle valve driving speed Sv into the duration Hd of high level H of PWM pulse having a period of 50 msec (step 17), and data D representing this is delivered to PWM counter 102 (step 18). However, because the "constant speed running control" (step 8) is repeated at a period of 10 msec while the PWM pulse has a period of 50 msec, to achieve a synchronization in a simple manner during "delivery of D=Hd" (step 18) in the "constant speed running control", the number of times the "constant speed running control" is executed is counted, and each time the count reaches 5, the count data is initialized to 0, and D=Hd derived at step 17 is delivered to PWM counter 102 only when the count data is equal to 0 (step 18).

Figure 6:
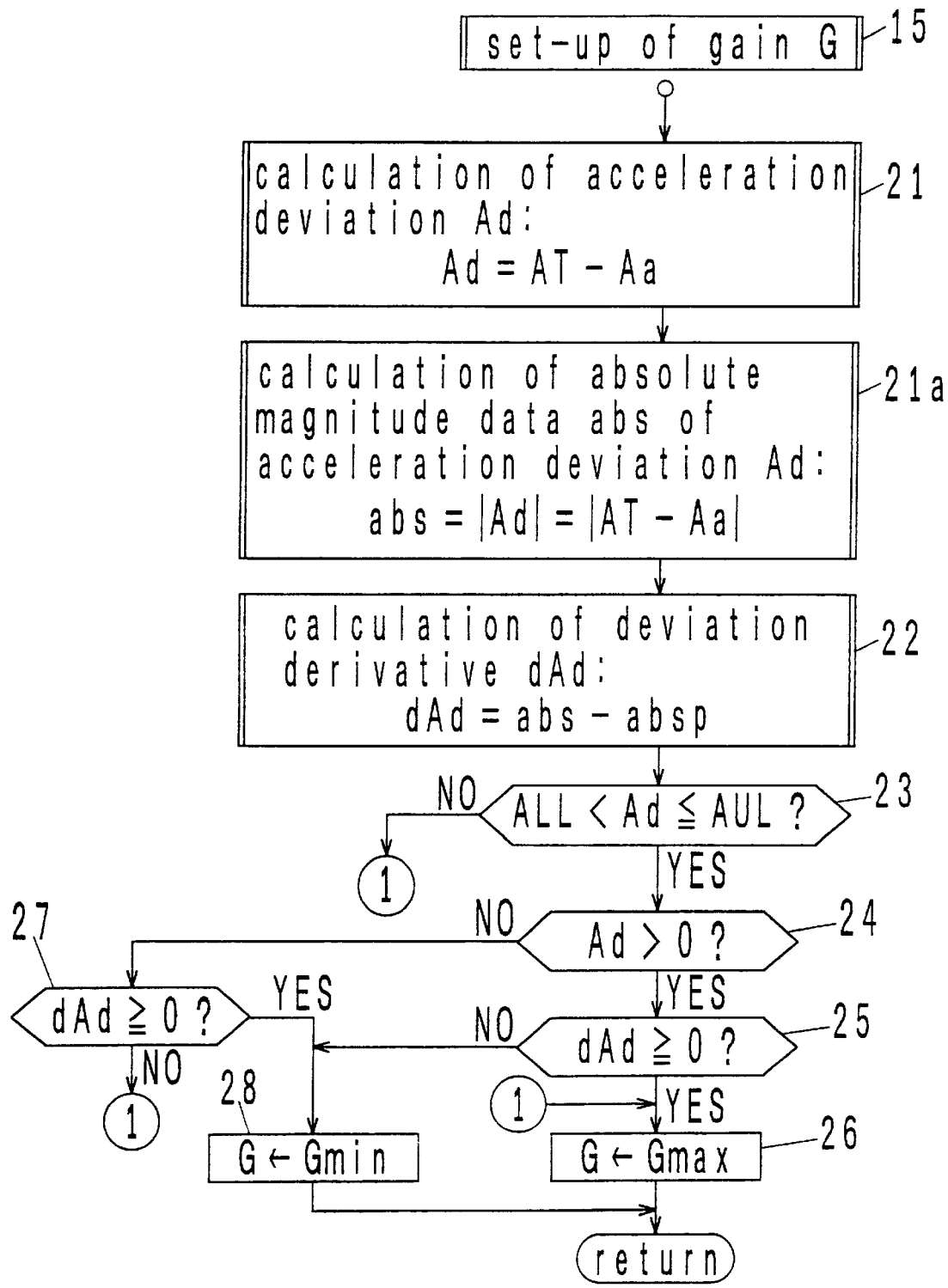
FIG. 6 is a flow chart showing "choice of gain G" (15) shown in FIG. 5 in detail.

Referring to FIG. 6, "set-up of gain G" (step 15) will be described in detail. Initially, an acceleration deviation Ad=AT−Aa is calculated (step 21), and the absolute magnitude data of the acceleration deviation Ad is calculated as abs=|Ad| (step 21*a*). A derivative of the absolute magnitude data abs is then calculated as dAd=abs−absp where absp represents absolute magnitude data which is calculated during the previous cycle (or 10 msec earlier) and which is stored in previous value register Rabsp. When the derivative dAd is calculated, it is stored in register RdAd, and the acceleration deviation Ad which is calculate during the current cycle is written into the previous value register RAdp to update it (step 22).

MPU 101 then examines if the acceleration deviation Ad which is calculated during the current cycle lies in a preset range ALL−AUL (step 23). This range defines a lower limit ALL and an upper limit AUL for the acceleration deviation Ad which permits a smooth and rapid convergence of an acceleration Aa to a target value AT. If the acceleration deviation Ad lies out of the preset range ALL−AUL, it becomes necessary to drive the throttle valve for a larger opening or closing, and accordingly, the gain G is fixed to a high value Gmax (fixed value) (from step 23 to step 26).

When the acceleration deviation Ad lies within the preset range, it is examined whether the acceleration deviation Ad is positive, meaning that the acceleration Aa is less than the target value AT, thus indicating a need to accelerate, or negative, meaning that the acceleration Aa is greater than the target value AT, indicating a need to decelerate (step 24). If the deviation is positive, a gain is determined in accordance with the polarity of the derivative dAd of the absolute magnitude data abs.

Specifically, if dAd is positive, indicating that the absolute magnitude of the deviation is increasing, the gain G is fixed to a high value Gmax (from step 25 to step 26) while if it is negative, indicating that the absolute magnitude of the deviation is decreasing, the gain G is fixed to a low value Gmin (fixed value) (from step 25 to step 28).

When the acceleration deviation Ad lies within the preset range and the acceleration deviation Ad is negative, indicating a need to decelerate, the gain is determined in accordance with the polarity of the derivative dAd of the absolute magnitude data abs.

Specifically, if dAd is positive, indicating that the absolute magnitude of the deviation is increasing, the gain G is fixed to a low value Gmin (from step 27 to step 28) while if it is negative, indicating that the absolute magnitude of the deviation is decreasing, the gain G is fixed to a high value Gmax (from step 27 to step 26).

The gain G which is determined in the manner mentioned above is used in the feedback calculation during "calculation of throttle valve driving speed Sv" (step 16) mentioned above, so that whenever the acceleration deviation Ad lies out of the preset range, and whenever acceleration deviation Ad increases if the deviation lies within the preset range, the throttle valve is driven rapidly for opening (when Sv is positive) or for closing (when Sv is negative), thus achieving a high tracking rate and convergence rate of the vehicle speed Vs with respect to the target vehicle speed Vo and preventing the vehicle speed Vs from undershooting the target vehicle speed Vo. When the acceleration deviation Ad decreases, the gain G is reduced, whereby an overshooting of the actual vehicle speed Vs with respect to the target vehicle speed Vo is suppressed, preventing the occurrence of a hunting.

In the first embodiment mentioned above, the gain G is fixed to either one of the two values, namely, high value Gmax or low value Gmin, in accordance with the acceleration deviation Ad and its derivative dAd.

Second Embodiment

The hardware and a substantial portion of the operation of the second embodiment remains the same as in the first embodiment.

Figure 7:
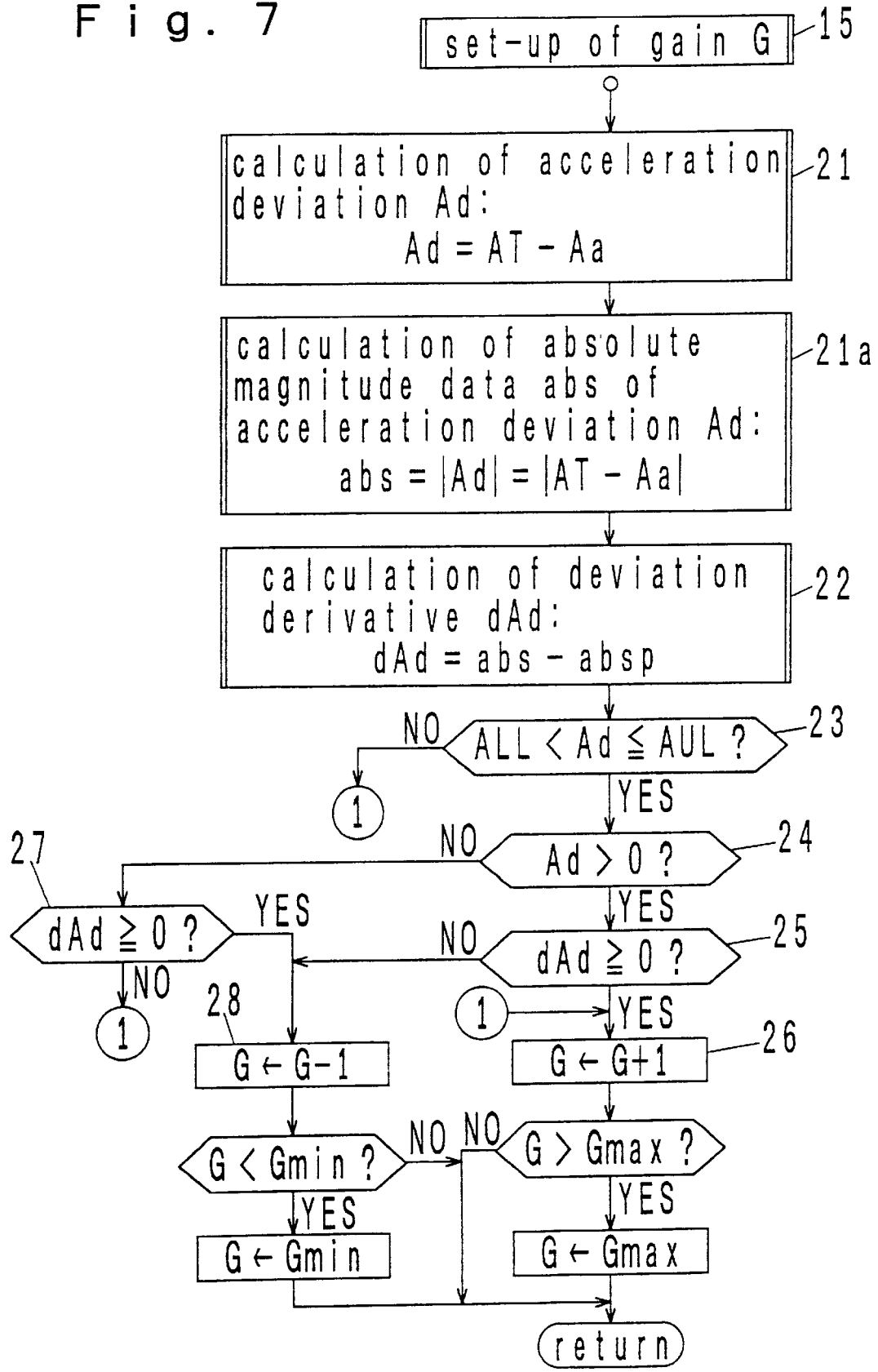
FIG. 7 is a flow chart of a processing operation, which is different from that performed by the first embodiment, of MPU 101 in a second embodiment of the invention.

However, in the second embodiment, MPU 101 executes the "set-up of gain G" (step 15) included in the "constant speed running control" (step 8) according to the scheme illustrated in FIG. 7.

Specifically, where the gain G is fixed to a high value Gmax in the first embodiment, the gain G is changed by one step (step 26 in FIG. 7), and if the stepped up gain G exceeds the high value Gmax, the gain G is updated to the high value Gmax (steps 26*a* and 26*b*). Similarly, where the gain G is fixed to a low value Gmin in the first embodiment, the gain G is changed by one step (step 28 in FIG. 7), and if the stepped down gain G falls below the low value Gmin, the gain G is updated to the low value Gmin (steps 28*a* and 28*b*). In other respects, the arrangement and operation are similar to the first embodiment.

In the first embodiment, the gain G is determined to either the high value Gmax or the low value Gmin. By contrast, in the second embodiment, the gain G is changed stepwise between the high value Gmax and the low value Gmin, thus changing smoothly. The second embodiment is preferred for use where the control period Ts and/or PWM period is relatively short since a smooth change in the output D=Hd is allowed, thus allowing a smooth variation in the motor driving speed.

While preferred embodiments of the invention has been shown and described above, a number of changes and modification are possible therein. Accordingly, it is not intended that the invention be limited to the specific construction or arrangement disclosed herein but that the right is reserved to all change and modifications coming within the scope of invention defined by the appended claims.

What is claimed is:

1. A vehicle speed control system comprising:

drive means for opening or closing a throttle valve of an engine onboard a vehicle;

speed detecting means for detecting a running speed Vs of a vehicle;

calculation means for calculating a target acceleration AT on the basis of the running speed Vs and a target speed Vo;

acceleration detecting means for detecting a running acceleration Aa of a vehicle;

calculation means for calculating a deviation of the running acceleration Aa with respect to the target acceleration AT, Ad=AT−Aa;

gain set-up means for establishing a high gain G when the deviation Ad is positive and its change dAd is also positive and establishing a low gain G when the deviation Ad is negative and its change dAd is positive;

feedback calculation means for calculating a controlled variable in accordance with the deviation Ad and gain G, deriving a larger value for the controlled variable when the deviation and the gain are high;

and output means for driving the throttle valve for opening or closing through the drive means at a rate which depends on the controlled variable.

2. A vehicle speed control system according to claim 1 in which the gain set-up means determines a high gain G when the deviation Ad is positive and its changed dAd is also positive and determines a low gain G when the deviation Ad is negative and its change dAd is positive whenever the deviation Ad lies within a preset range, and chooses a high gain whenever the deviation lies out of the preset range.

3. A vehicle speed control system according to claim 1 in which the gain set-up means increases the gain G by one step when the deviation Ad is positive and its change dAd is also positive and decreases the gain G by one step when the deviation Ad is negative and its change dAd is positive whenever the deviation Ad lies within the preset range, and increases the gain G by one step whenever the deviation Ad lies out of the preset range.

4. A vehicle speed control system according to claim 3 in which the gain set-up means changes the gain G to a preset value Gmax whenever the gain G which is increased by one step exceeds the preset value Gmax, and also changes the gain G to another preset value Gmin when the gain G which is decreased by one step falls below the preset value Gmin.

* * * * *